Feb. 18, 1947.  J. J. DOSTAL  2,415,872
INDEXING APPARATUS
Filed Nov. 16, 1942  3 Sheets-Sheet 1
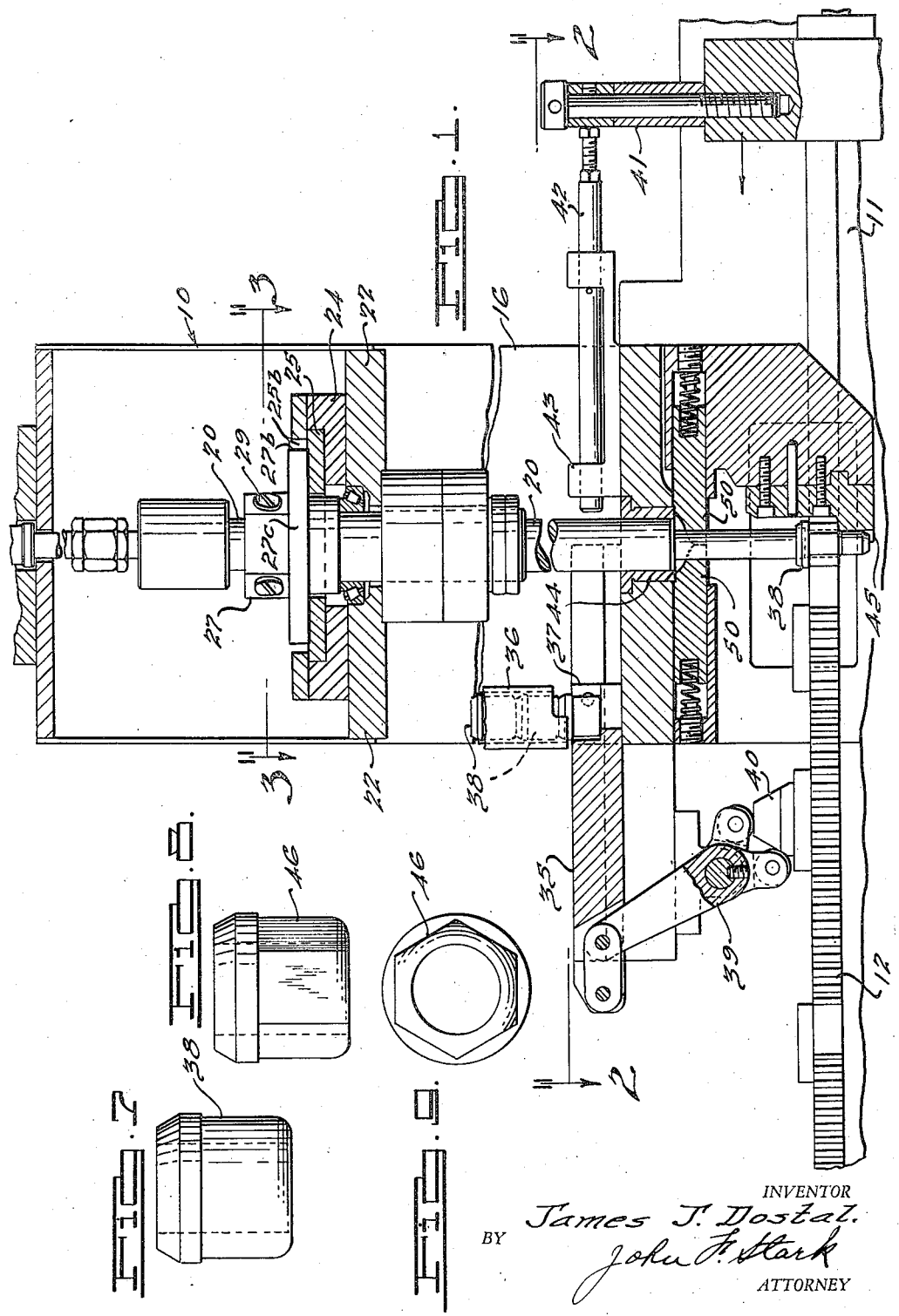
INVENTOR
James J. Dostal.
BY John F. Stark
ATTORNEY

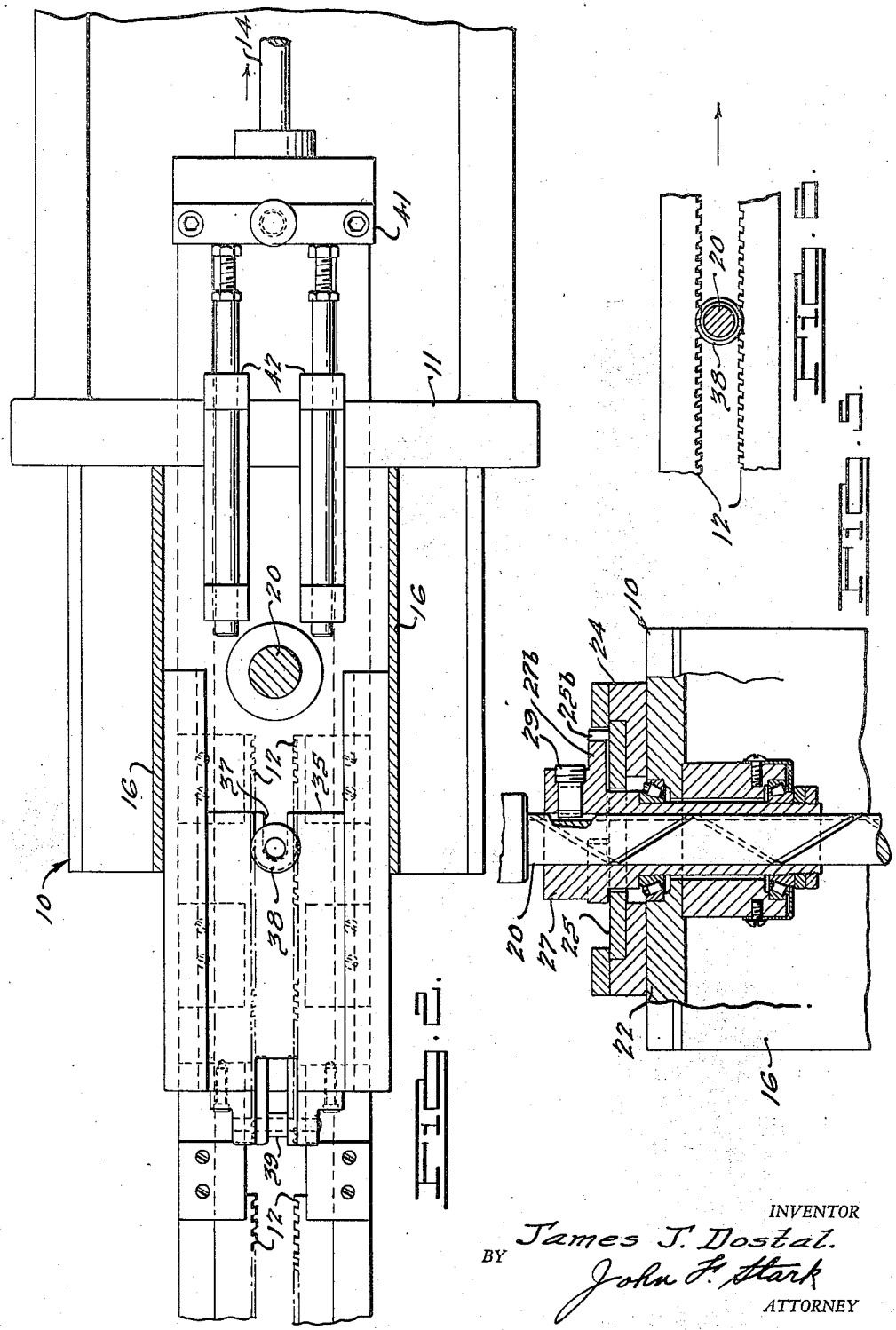

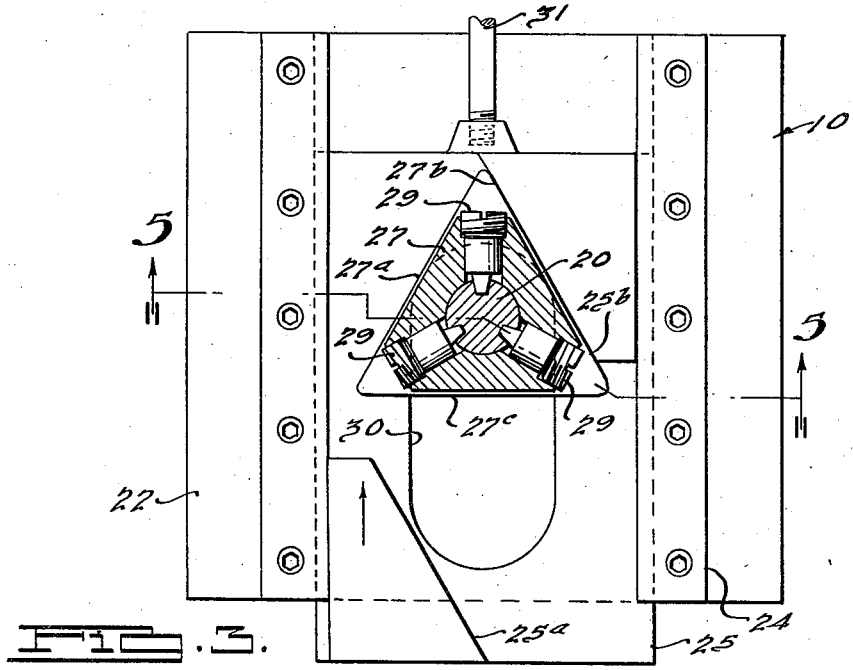
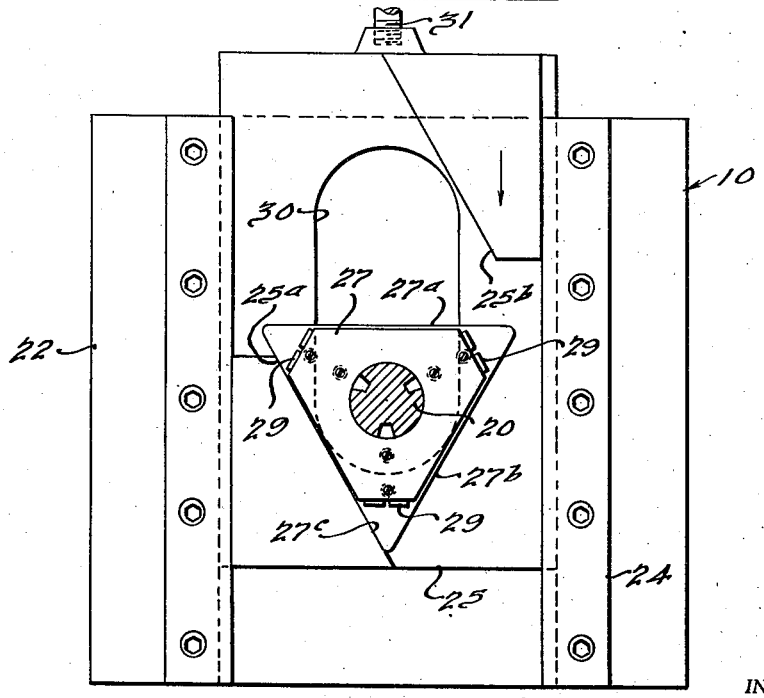

Patented Feb. 18, 1947

2,415,872

UNITED STATES PATENT OFFICE 2,415,872

INDEXING APPARATUS

James J. Dostal, Detroit, Mich., assignor to Eaton Manufacturing Company, Cleveland, Ohio, a corporation of Ohio Application November 16, 1942, Serial No. 465,652

3 Claims. (Cl. 74—129)

This invention relates to an indexing apparatus especially adaptable for performing two or more related operations on a work piece.

Among the objects of the present invention is the provision of a rotatable indexing apparatus to accurately and rapidly index and lock in fixed position, a work piece incidental to performing a series of related machine operations thereon; the provision in an indexing apparatus as described of means for automatically positioning a work piece in timed relation to operations to be performed thereon, for instance, such as drilling, milling, broaching and so forth; the provision in a rotatable indexing apparatus as described of fluid powered means, automatically operated in timed relation to sequential machine operations, for rotatively positioning a work piece requiring two or more operations thereon.

Further and other objects and advantages of the present invention reside in the novel combination and arrangement of parts about to be described, when considered in conjunction with the drawings, forming a part of this specification, and which are more particularly pointed out in the appended claims.

In the drawings like reference characters denote corresponding parts in the several views, and in which:

Fig. 1 illustrates a side elevational view of a machine table, with portions broken away to reveal details thereof, embodying indexing apparatus for a work piece thereof according to the teaching of this invention; and Fig. 2 is a top plan view of the apparatus shown in Fig. 1, taken substantially on the line 2—2 thereof; and Fig. 3 is a plan view of a detail of the indexing apparatus shown in Fig. 1 taken substantially on the line 3—3 thereof; and Fig. 4 illustrates a plan view of the same detail as shown in Fig. 3 with the index parts in an opposite position; and Fig. 5 is a vertical sectional view through the detail of the indexing apparatus shown in Fig. 3, taken substantially on the line 5—5 thereof; and Fig. 6 is a small diagrammatic plan view of the cutting tool with the work therebetween; and Fig. 7 is an elevational view of a rough work piece; and Figs. 8 and 9 are elevational and bottom plan views of the work piece after operating thereon, respectively.

To provide a background for the indexing apparatus forming the principal part of this invention and, to which attention will soon be directed, reference may be had to the drawings, and, more particularly in Figs. 1 and 2, there is shown an elevational view and a plan view of a portion of a broaching machine, generally designated 10, adapted to perform a series of related operations upon a work piece thereof. The machine 10 has a base 11 upon which in suitable "ways" a movable table is reciprocated by a ram 14 powered by a gear and toothed rack, not shown, and carries the broaching tool 12. A sub-frame structure 16, mounted intermediate the longitudinal length of the base 11, rises vertically from either side of the top of the movable table. Positioned centrally of the sub-frame 16 and extended vertically therethrough from the upper end, where it is operably connected to a fluid powered cylinder, not shown, is a reciprocable spindle 20 which has a tapered and splined annular lower work-receiving end adapted to be projected downwardly through a central opening in the table into the area between the spaced cutting teeth of the broach 12.

In order to control feeding and reversal of the cutting tool, and several timed movements of the work feeding and indexing apparatus stops, cam means and bleeder valves actuated thereby are stationed at the necessary positions and the operation and the individual elements are not claimed per se. It will be understood the indexing mechanism or apparatus about to be described is adaptable to various types of machine elements and consists of indexing and locking members having angular cooperating faces thereon to effect positioning of machine parts. Accordingly, the present machine which is used to produce several related broaching operations upon an annular work piece is merely supplied to form a setting or background for the indexing apparatus and forms no part of the present invention per se. The said machine tool broaching operations being covered in my co-pending application, filed on even date herewith, and to which reference may be had for a more detailed explanation thereof.

Having particular reference to Figs. 3, 4 and 5 there is shown an indexing mechanism which forms the principal part of this invention and which comprises in part a centrally apertured support plate 22, that is secured to opposite sides of the upright sub-frame 16, and through which is reciprocally journalled and extended the work spindle 20. Upon the support plate 22 is positioned in suitable "ways" 24 which slidably receive it, a table 25 having mounted thereon indexing and locking members 25a and 25b of predetermined form and disposition to effect the desired indexing and locking of the work spindle 20, as best shown in Fig. 3 or 4. Between the indexing and locking mmebers 25a and 25b is a rotatable and locking member 27, in this case of triangular form to match the angular face of the indexing and locking members 25a and 25b which is fixed in a manner to rotate spindle 20 to produce the desired indexing effected by said indexing and locking members. In order to effect slidable securement of the block 27 to the spindle 20 in a manner permitting fine adjustment thereof to take all lost motion out of the connection there are shown a plurality of fingers 29, in this case three to match the number of faces on the indexing and locking member 27, which fit into complementary splines in the spindle 20 and which are threaded and locked into the rotatable member 27. The table 25 has a central slotted opening 30 to permit movement thereof without interfering with spindle 20 as shown in Figs. 3 and 4, and, furthermore, a connecting rod 31 is fixed to the table 25 and to a fluid-powered cylinder, not shown, to effect the movement of the indexing and locking members 25a and 25b as shown by the arrows thereon in Figs. 3 and 4.

The slidable indexing locking members 25a and 25b are generally triangular in plan each with an elongated angular flat surface accurately finished and extended normally from the surface of the table 25, as best shown in Fig. 5. Likewise the rotatable member 27 is also triangular in plan, and has accurately finished angular faces designated 27a—b—c, cooperating with the angular flat faces on slidable members 25a and 25b, as shown in Figs. 3 and 5. From the illustration of Fig. 3 it will be apparent that the spindle 20 and attached member 27 are centrally positioned in elongated slot 30 in the slidable table 25, and, as shown by the direction of the arrow thereon, the table 25 is in position to be moved transverse to the spindle 20. As movement of the table 25 takes place the angular face of member 25a thereof will, in due course, contact an adjacent corner of the triangular foot of the member 27 and rotatably index the same, together with its attached spindle 20 and work piece, until the face 27c thereof comes into face-to-face abutting relation therewith, locking member 27 in rigid fixed position, as shown in Fig. 4. Prior to the advance of member 25b the member 25a has been moved away from the face 27a of the triangular member 27, permitting the rotation thereof, as shown in Fig. 3. Since the transverse movement of the table 25 takes place by means of the connecting rod 31 secured to a fluid-powered cylinder, not shown, it will be seen from the position of the table 25 with respect to the triangular rotatable member 27 that the locking member 25b is now in a position to be actuated according to the direction of the arrow as shown in Fig. 4. During this subsequent related operation the face 25b will contact the face 27a of the triangular member 27 and rotatably index the work carrying spindle, in this instance, another aliquot portion of a revolution.

One of the chief values and features of such an index apparatus as that described, which renders it so acceptable to machine tool and parts manufacturers, is the rugged, positive stop means incident to each index motion, as distinguished from delicate geneva motions and other conventional forms, whereby the substantial length of the abutting face-to-face relation of the locking means provides for unusually long life with maximum accuracy for the work to be performed; and the adjustability feature afforded by the movable fingers 29, in member 27, which fit into complementary splines in the spindle 20 to remove substantially all lost motion from the cooperating parts.

From the foregoing detailed description of the indexing apparatus it will be apparent that by very obvious variations of the faces 25a—b both as to number and shape, and likewise the cooperating indexing and locking member 27, that any desired equal index steps may be made by shaping the faces of the component parts to form a variety of operations on such machine tools as drilling, broaching, reaming and milling. Since the index apparatus has been illustrated in conjunction with a specific machine tool, reference will now be made to its applicability in that field.

A work receiving shoe 35, as best shown in Figs. 1 and 2, which receives a work piece from a hopper 36, is slidably supported in suitable ways in the sub-frame 16 above the base 11 and parallel to the longitudinal axis of the broach 12. A slotted U-shaped end 37 of the shoe 35 is arranged in a retracted position of the shoe, as shown in Fig. 1, to afford reception for the annular shouldered work piece 38, shown in Fig. 7. At the opposite end of the shoe 35 a lever and crank arm 39 pivoted thereto has a roller arranged to be actuated, at suitable timed intervals with respect to the travel of the broaching tool 12, by spaced cam plates 40 secured thereto, for propelling the work receiving shoe. As the broaching tool 12 is retracted an adjustable stop means 41 secured thereto is arranged to contact a pair of slidable rods 42 journalled in a plate 43 secured adjacent the forward or advanced position of the movable work receiving shoe 35, whereby it will be repelled to its original position in line to receive another work piece to repeat the cycle of operation.

As the work receiving shoe 35 is moved forward with the work piece 38 in place, when it arrives under the work receiving spindle 20, which has a tapered serrated lower end, the spindle is forced through a central opening in the annular work piece, and the work removed from the shoe 35 is then moved through a hardened bushing 44 to dispose it in working position between the spaced teeth of broaching tool 12. After the several related operations are performed upon the work piece to reduce it to the finished form 46, shown in Fig. 8, a stripping means 50, shown in Fig. 1, which admits the rough work piece to the tool automatically closes and upon retraction of the work spindle 20 strips the finished work from the spindle when it then falls into a basket below the machine.

As best shown in Fig. 2 the tool 12 consists of three sets of parallel broaches with predetermined longitudinal spacing between each set of broaches. Accordingly, in timed relation to the travel of the tools presenting a blanked space to the work, the work is then automatically indexed by fluid power according to the setting of the indexing and locking means 25—27, previously mentioned, an aliquot portion of a revolution to enable performance of the next related broaching operation thereon. Thereafter the work piece is rotatably indexed a second time and two more sides of the work piece are flatted-off to form a hexagon nut blank as shown in Figs. 7 and 8.

From the foregoing it will now be apparent there has been disclosed a novel indexing apparatus embodying, among other things, the objects and advantages of the invention first enumerated. It is not intended to be limited, however, in the application of the specific form of indexing apparatus to the concrete example of the broaching machine upon which it was herein described in conjunction, as this was merely for purposes of illustration, and it will now be apparent that many formal modifications will now be suggested to those skilled in this art, whereby it may be adapted to other operations and work pieces as suggested, and the scope of the invention is considered commensurate with the spirit and substance of the following claims.

What I claim is:

1. Indexing mechanism comprising in combination regular polygonal member having an odd number of sides or faces and rotatable about its axis, a slide reciprocable in a straight line movement and substantially in a plane perpendicular to said axis, a pair of cams on said slide, each cam having a substantilly straight cam surface, said cam surfaces being parallel and generally facing each other, said cam surfaces being spaced from each other longitudinally of the slide in the direction of reciprocation thereof and disposed on opposite sides of said member, said cam surfaces being spaced from each other transversely of the slide and disposed on opposite sides of said member axis, the perpendicular distance between planes passing through said cam surfaces being at least as great as the maximum transverse dimension of said polygonal member, said cam surfaces being disposed at an angle to the direction of reciprocation of said slide equal to one-half of one of the angles of the polygon, means for reciprocating said slide whereby to cause said cam surfaces to alternately engage and rotate said member until each cam surace abuts and engages an adjacent face of the polygon member, said latter engagement serving to limit further movement of the silde in the corresponding direction of reciprocation thereof.

2. Indexing mechanism comprising, in combination, a many sided member rotatable about a central axis, having more than two sides joining each other with their included angles substantially equal, a slide movable back and forth in a predetermined path in a plane substantially perpendicular to said axis, said slide having a pair of cam surfaces fixed thereto on opposite sides of said member, in the direction of said back and forth movement, to alternately engage the sides of said member during the back and forth movement thereof, said cam surfaces being on opposite sides of said member in a direction transverse to the movement of said slide, each said cam surface, from a point nearest said member, extending in a direction away from said member, at an angle to said direction of movement and toward an extended path of movement of said opposite cam member, the angle said cam surfaces make with said path of movement being substantially equal to the angle a side makes with said path when engaged by said surface in locked indexed position, the spacing of said cam surfaces transversely of said path and the length of said surfaces being such that, upon each movement of said slide, one of said surfaces will engage a side in a cam action to turn it around its axis to indexed position at which point said cam surface engages said side sufficiently to prevent it from rotating in either direction and sufficiently beyond its mid point toward its trailing end to effectively stop said cam and therefore said slide from further movement in the corresponding direction of movement thereof.

3. Indexing mechanism comprising, in combination, an equilateral triangular member rotatable about a central axis, a slide movable back and forth in a predetermined path in a plane substantially perpendicular to said axis, said slide having a pair of cam surfaces fixed with respect thereto in a plane adapting them for engagement with said member, each of said cam surfaces being at least in part complementary to the outer end portions of each of said sides, said cam surfaces being arranged in generally opposed relation with respect to each other on opposite sides of said axis both in the direction of said back and forth movement and in a direction transverse thereto and being so spaced from each other and so disposed as to alternately engage the sides of said member as said slide is moved back and forth, each said cam surface, from a point nearest said member, extending in a direction away from said member, at an angle to said direction of movement and toward an extended path of movement of said opposite cam member, the angle said cam surfaces make with said path of movement being substantially equal to the angle a side makes with said path when engaged by said surface in locked indexed position, the spacing of said cam surfaces transversely of said path and the length of said surfaces being such that, upon each movement of said slide, one of said surfaces will engage a side in a cam action to turn it around its axis to indexed position at which point said cam surface engages said side sufficiently to prevent it from rotating in either direction and sufficiently beyond its mid point toward its trailing end to effectively stop said cam and therefore said slide from further movement in the corresponding direction of movement thereof.

JAMES J. DOSTAL.

REFERENCES CITED

The following references are of record in the file of this patent:

UNITED STATES PATENTS

| Number | Name | Date |
| --- | --- | --- |
| 388,390 | Barton | Aug. 28, 1888 |
| 852,346 | Porteous | Apr. 30, 1907 |
| 891,945 | Muther | June 20, 1908 |
| 459,878 | Aiken | Sept. 22, 1891 |